J. L. MOHUN AND H. R. STAFFORD.
LATERAL THRUST BEARING FOR RAILROAD AXLES.
APPLICATION FILED JAN. 2, 1919.
1,306,387.
Patented June 10, 1919.
3 SHEETS—SHEET 2.
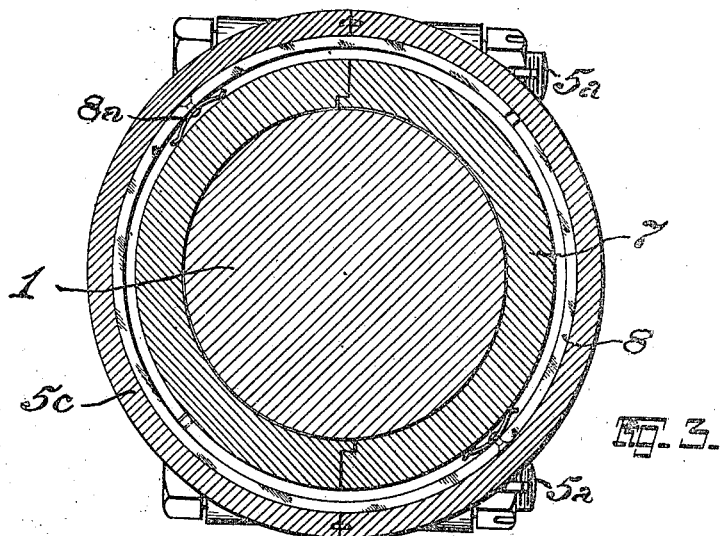
Fig. 3.
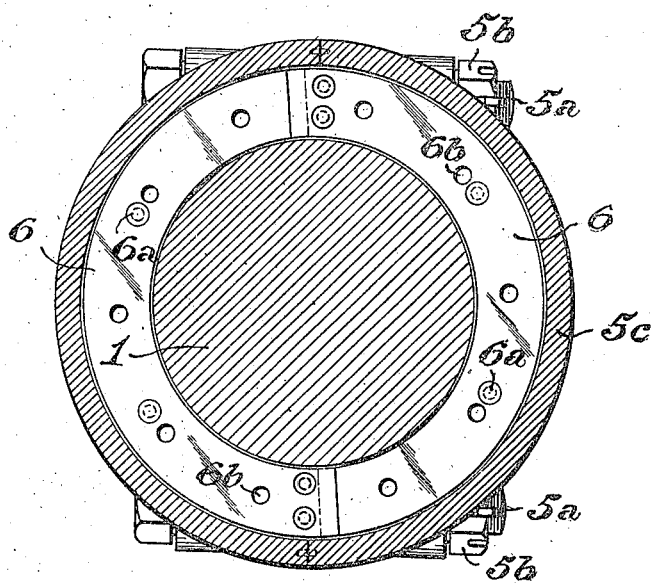
Fig. 4.
Fig. 5.
Fig. 6.
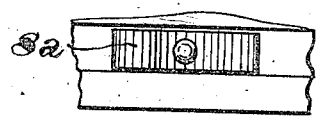
Fig. 7.
WITNESSES:
E. A. Wright
S. R. Bell
INVENTORS
JOHN L. MOHUN
HAL R. STAFFORD
by Snowden Bell
atty.

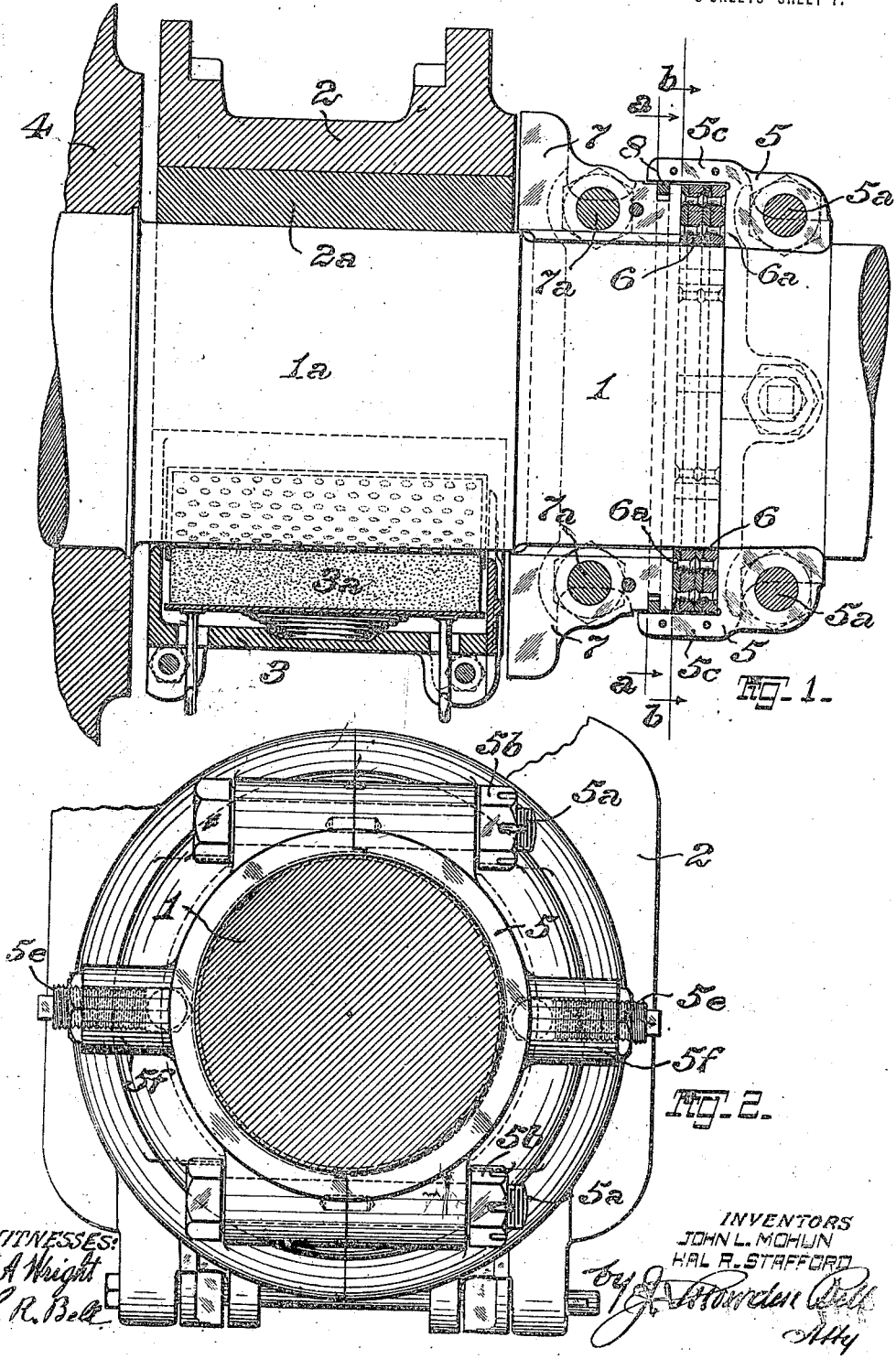

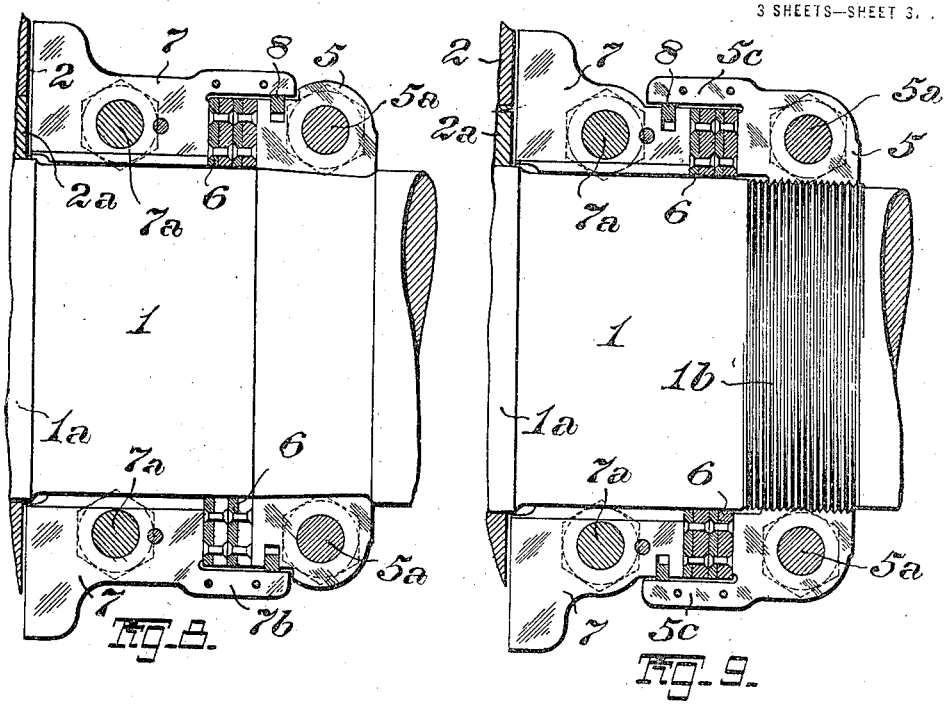
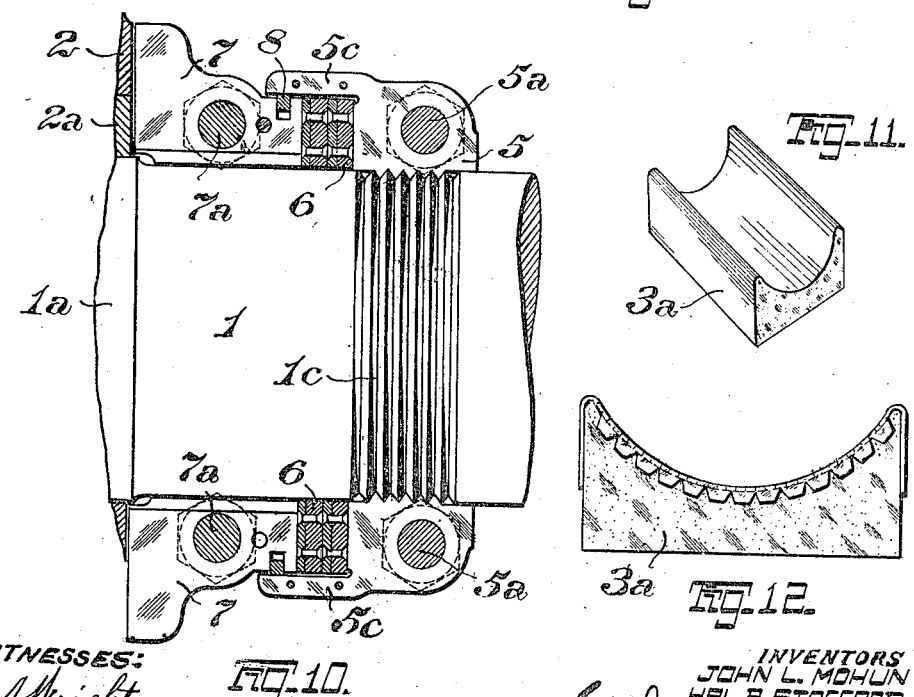

UNITED STATES PATENT OFFICE.

JOHN L. MOHUN, OF BROOKLYN, NEW YORK, AND HAL R. STAFFORD, OF PLAINFIELD, NEW JERSEY.

LATERAL-THRUST BEARING FOR RAILROAD-AXLES.

1,306,387. Specification of Letters Patent. Patented June 10, 1919.

Application filed January 2, 1919. Serial No. 269,345.

*To all whom it may concern:*

Be it known that we, JOHN L. MOHUN, of Brooklyn, in the county of Kings and State of New York, and HAL R. STAFFORD, of Plainfield, in the county of Union and State of New Jersey, have jointly invented a certain new and useful Improvement in Lateral-Thrust Bearings for Railroad-Axles, of which improvement the following is a specification.

Our invention, while more particularly designed for application in connection with the driving axles of locomotives, is not limited to such specific application, as it is also desirably operative on axles of other railroad vehicles. The object of the invention is to provide improved means, adaptable, without substantial expense, in railroad vehicles of present standard constructions, for limiting the relative lateral movements of vehicle frames and of the wheels and axles, on which they are supported.

The improvement claimed is herein fully set forth.

It has heretofore been the ordinary practice, in the operation of locomotive driving axles, to take the lateral thrust upon the inner ends of the wheel hubs and the adjoining outer ends of the axle bearing boxes or driving boxes. Experience has developed this practice to be objectionable, for the following reasons:

First, the thrust bearing surfaces being in practically the same vertical planes as the wheel tires, grit and mud which fall from the tires and find lodgment on these surfaces, rendering lubrication difficult, the oil or grease which is applied and is not thrown off by centrifugal force, merely causing the foreign matter to adhere to the wearing surfaces. Second, the difficulty of lubricating the thrust bearing surfaces causes them to wear in concentric interlocking ridges, and as the bearing brasses become worn and the boxes assume lower positions on the axle, the ridges on the hubs become eccentric to those on the faces of the boxes; heat is thereby generated, due to the roughness and reduction of the contact surfaces and these are rapidly cut away, the excessive heat generated resulting in hot boxes and cut journals. Third, it being necessary to cut away a considerable portion of the lower part of the axle boxes, for the reception of the lubricant cellars, it is impossible to provide continuous bearing faces on the boxes, these being what may be described as horse shoe or inverted U shaped. It results from this that the thrust, which is applied uniformly around the axial line of the axle, is resisted by a bearing surface which extends only partially around it, and, further, the removal of the lower portions of the axle boxes presents sharp edges therein, which tend to wipe away the lubricant from the bearing surfaces. The disadvantages resultant on these conditions are well recognized by those familiar with the operation of locomotives. Fourth, in the ordinary constructions no means are provided for taking up wear, after lateral movement has become excessive.

Among the features of practical advantage of our invention, the following may be enumerated: first, continuous annular thrust bearing surfaces; second, multiple bearing surfaces, which are continuously concentric, irrespective of the wear of bearing brasses; third, an inclosed dust proof adjustable thrust bearing, and means for lubricating it, and, fourth, absolute prevention of the friction and heating by contact of the axle boxes and wheel hubs which occur in the operation of prior constructions.

In the accompanying drawings: Figure 1 is a vertical longitudinal central section through a lateral thrust bearing appliance embodying our invention; Fig. 2, an end view of the same, as seen from the right; Figs. 3 and 4, transverse sections, on the lines $a\ a$ and $b\ b$, respectively, of Fig. 1; Fig. 5, a view, partly in elevation and partly in section, and on an enlarged scale, showing a portion of the thrust bearing rings, as seen from one side of the appliance; Fig. 6, a view, in elevation, of the overlapping portion of the lubricant retaining ring; Fig. 7, a plan view of one of the springs of said ring; Figs. 8, 9 and 10, sectional views, taken similarly to Fig. 1, illustrating modifications of structural detail; Fig. 11, a view, in perspective, of a cake of solid grease for lubricating the axle journal, and, Fig. 12, an end view, on an enlarged scale, of the same, with a distributing plate attached.

In the practice of our invention, referring descriptively to the specific form of embodiment thereof in connection with a locomotive driving axle, which is herein exemplified, the axle, 1, carries, on each of its journals, 1ª, in the usual manner, a driving box, or axle bearing box, 2, which is fitted with a bearing brass, 2ª, and is recessed, at bottom, to receive a detachably connected lubricant cellar, 3. The outer ends of the box and bearing brass are located adjacent to, but continuously out of contact with, the driving wheel hub, 4. The driving axle is circumferentially recessed or reduced in diameter, each of the recesses commencing a short distance from the inner end of one of the journals, 1ª, and extending sufficiently far along the axle to receive, on its inner end portion, a fixed bearing collar, 5. A transmission ring, 7, is fitted freely on the axle, adjacent to the axle bearing box, and compound thrust rings, 6, hereinafter described, are interposed between the fixed and loose members.

The bearing collar, 5, is formed in two abutting semi-annular sections, in order to be attachable to, and detachable from, the axle, the sections being connected together and clamped firmly upon the axle, by transverse bolts, 5ª, and nuts 5ᵇ. Circumferential flanges, 5ᶜ, are formed on the ends of the collar sections nearer the axle box, said flanges abutting and forming the outer wall of a casing or housing, in which two or more compound thrust rings, 6, 6, each formed in two sections for application to and removal from the axle, are fitted freely around it. The sections of the thrust rings are each composed of a steel and a bronze member, connected by rivets, 6ª, and are lapped at their joints one with the other, as indicated by broken lines in Fig. 4. Perforations, 6ᵇ, are formed in the thrust rings, for the passage of lubricant, which is forced against and between them by screw plugs, 5ᵉ, closing lubricant cups, 5ᶠ, projecting from the periphery of the bearing collar, 5. Adjustment to compensate for wear under lateral motion pressure is effected, as from time to time desired, by the removal of one or more of the compound thrust rings and the substitution of thicker rings.

Figs. 9 and 10 illustrate structural modifications providing for the longitudinal adjustment of the fixed bearing collar, 5, on the axle. As shown in Fig. 9, a screw thread, 1ᵇ, is cut on the axle, and the sections of the bearing collar are correspondingly internally threaded. By slackening the bolts, 5ª, and rotating the collar on the axle, longitudinal adjustment may, as desired, be effected. In the construction shown in Fig. 10, a plurality of adjoining circumferential grooves, 1ᶜ, is cut in the axle, and the sections of the bearing collar are correspondingly recessed. Longitudinal adjustment is, in this case, effected by slackening the bolts, disengaging the sections of the bearing collar from the axle grooves, moving the sections longitudinally and reëngaging them with the grooves when in desired adjusted position, and clamping them in such position, on the axle, by the bolts 5ª, and nuts, 5ᵇ.

The pressure resultant on lateral motion of the axle boxes, 2, is imparted from each of them to the adjoining bearing collar 5, through a transmission ring, 7, formed in two semi-annular segments, for application to and removal from the axle, the segments being connected by transverse bolts, 7ª, each having a proper nut on one end. The ring, 7, which is fitted freely on the axle, is interposed between the compound thrust rings, 6, against the nearer of which it normally abuts, and the inner end of the axle box, being normally spaced at a distance from the latter equal to substantially one half the lateral motion allowed to the driving boxes. A lubricant retaining ring, 8, formed in two sections, which are lapped at their joints, as shown in Figs. 3 and 6, is fitted in a circumferential groove in the portion of the transmission ring, 7, which is inclosed by the thrust ring casing, 5ᵈ, the segments being pressed outwardly, to maintain a tight joint between the rings, 7 and 5, by springs, 8ª.

It will be seen that in order to pack the lubricant cellar, 3, by the insertion of a cake of solid grease, 3ª, therein, as is now practically universal practice in the operation of locomotive driving boxes, it is necesary to detach the bearing collar or the transmission ring above described, or both, from the axle. For the purpose of packing the cellar, we consider it preferable to remove the bearing collar and slide the transmission ring sufficiently far from the axle box to allow of the removal of the cellar. If, however, the casing inclosing the compound thrust rings be formed by a circumferential flange, 7ᵇ, on the transmission ring, 7, as shown in Fig. 8, instead of on the bearing collar, the detachment of the transmission ring will enable the cellar to be removed for packing.

In the operation of a lateral thrust bearing appliance embodying our invention, the pressure developed by the lateral motion of either of the bearing boxes of an axle of a locomotive or other railroad vehicle, is transmitted, from the inner end thereof, through the loose ring, 7, to the compound thrust rings, 6, 6, and is received therefrom by the axle, through the bearing collar, 5, fixed thereon. The friction of the box on the transmission ring being greater than that of the latter on the lubricated compound thrust rings, 6, 6, there will be no movement of the transmission ring, relatively to the axle box, and any rotatory movement that will be developed will be that of the thrust rings. There being no contact, under any conditions, between the outer ends of the axle boxes and the wheel hubs, the objections, before noted, which have been developed in the operation of prior devices, in which lateral motion pressure is exerted on the abutting surfaces of these members, will be entirely eliminated.

We claim as our invention and desire to secure by Letters Patent:

1. In a lateral thrust bearing mechanism for railroad axles, the combination of an axle; an axle bearing box fitted thereon with the capacity of relative longitudinal movement; a bearing collar fixed on the axle; and a transmission ring mounted freely on the axle, between the axle bearing box and the bearing collar.

2. In a lateral thrust bearing mechanism for railroad axles, the combination of an axle; an axle bearing box fitted thereon with the capacity of relative longitudinal movement; a bearing collar fixed on the axle; a transmission ring mounted freely on the axle, between the axle bearing box and the bearing collar; and means for taking up wear between said collar and ring.

3. In a lateral thrust bearing mechanism for railroad axles, the combination of an axle; an axle bearing box fitted thereon with the capacity of relative longitudinal movement; a bearing collar rigidly secured to the axle; a transmission ring mounted freely on the axle, between the axle bearing box and the bearing collar; and means for longitudinally adjusting the bearing collar on the axle.

4. In a lateral thrust bearing mechanism for railroad axles, the combination of an axle; an axle bearing box fitted thereon with the capacity of relative longitudinal movement; a bearing collar fixed on the axle; a transmission ring mounted freely on the axle, between the axle bearing box and the bearing collar; and one or more freely mounted thrust rings interposed between the transmission ring and the bearing collar.

5. In a lateral thrust bearing mechanism for railroad axles, the combination of an axle; an axle bearing box fitted thereon with the capacity of relative longitudinal movement; a bearing collar rigidly secured to the axle; a transmission ring mounted freely on the axle, between the axle bearing box and the bearing collar; one or more freely mounted thrust rings interposed between the transmission ring and the bearing collar; and means for inclosing said thrust rings and holding lubricant therefor.

6. In a lateral thrust bearing mechanism for railroad axles, the combination of an axle; an axle bearing box fitted thereon with the capacity of relative longitudinal movement; a bearing collar rigidly secured to the axle; a transmission ring mounted freely on the axle, between the axle bearing box and the bearing collar; one or more freely mounted thrust rings interposed between the transmission ring and the bearing collar; an annular casing surrounding said thrust rings; and a lubricant retaining ring fitted in said casing, adjacent to an open end thereof.

7. In a lateral thrust bearing mechanism for railroad axles, the combination of an axle; an axle bearing box fitted thereon with the capacity of relative longitudinal movement; a bearing collar fixed on the axle; a transmission ring mounted freely on the axle, between the axle bearing and the bearing collar; one or more freely mounted thrust rings interposed between the transmission ring and the bearing collar; an annular casing inclosing said rings and fixed to one of the adjoining inclosures of the axle; and a lubricant retaining ring fitted in said casing adjacent to an open end thereof.

8. In a lateral thrust bearing mechanism for railroad axles, the combination of a circumferentially grooved axle; an axle bearing box fitted on an unbroken surface of said axle, with the capacity of relative longitudinal movement; a diametrically divided bearing collar, encircling the grooved portion of the axle and internally grooved correspondingly therewith; means for adjustably clamping the sections of the bearing collar on the axle; and a transmission ring mounted freely on the axle, between the axle bearing box and the bearing collar.

9. In a lateral thrust bearing mechanism for railroad axles, the combination of an axle; an axle box fitted thereon with the capacity of relative longitudinal movement; a diametrically divided bearing collar encircling said axle; transverse bolts by which the sections of said bearing collar are rigidly and detachably secured upon the axle; a diametrically divided transmission ring, fitted freely on the axle, between the axle bearing box and the bearing collar; transverse bolts connecting the sections of said ring; and a plurality of thrust rings, fitted freely on the axle, between said ring and the bearing collar.

JOHN L. MOHUN.
HAL R. STAFFORD.

Witnesses:
CHAS. F. PRESCOTT,
ELBERT R. BRONNER.